(12) United States Patent
Oike

(10) Patent No.: US 11,643,596 B2
(45) Date of Patent: May 9, 2023

(54) SCINTILLATOR PLATE, METHOD FOR MANUFACTURING SCINTILLATOR PLATE, AND RADIATION DETECTION APPARATUS

(71) Applicant: CANON KABUSHIKI KAISHA, Tokyo (JP)

(72) Inventor: Tomoyuki Oike, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/524,435

(22) Filed: Nov. 11, 2021

(65) Prior Publication Data

US 2022/0154069 A1 May 19, 2022

(30) Foreign Application Priority Data

Nov. 19, 2020 (JP) .............................. JP2020-192214

(51) Int. Cl.
*C09K 11/62* (2006.01)
*G01T 1/20* (2006.01)
*G01T 1/202* (2006.01)

(52) U.S. Cl.
CPC ............ *C09K 11/628* (2013.01); *G01T 1/202* (2013.01); *G01T 1/2018* (2013.01)

(58) Field of Classification Search
None
See application file for complete search history.

(56) References Cited

U.S. PATENT DOCUMENTS

| 2011/0160065 | A1* | 6/2011 | Aytug | ..................... C23C 28/00 428/209 |
| 2015/0034841 | A1* | 2/2015 | Shibutani | ................ C30B 29/12 250/483.1 |
| 2015/0346359 | A1* | 12/2015 | Yasui | .................... G01T 1/2023 250/367 |
| 2018/0052241 | A1* | 2/2018 | Nagarkar | ................ C23C 14/02 |

FOREIGN PATENT DOCUMENTS

JP           2019002801 A      1/2019

* cited by examiner

*Primary Examiner* — Edwin C Gunberg
(74) *Attorney, Agent, or Firm* — Canon U.S.A., Inc., IP Division

(57) ABSTRACT

A layer in which a primary phase composed of a columnar crystal material and a secondary phase composed of a material different from the primary phase are phase-separated being included as a base for forming a columnar crystal of scintillator plate improves separation of columnar crystals from each other and suppresses light scattering from occurring so as to realize a scintillator having high resolution.

10 Claims, 10 Drawing Sheets

FIG. 8

| | VAPOR SOURCE | | Cu CONCENTRATION Cu/Cs (mol%) | BASE LAYER | | MTF(2) RELATIVE VALUE |
|---|---|---|---|---|---|---|
| | BASE LAYER | UPPER LAYER | BASE LAYER AND INITIAL LAYER | THICKNESS (μm) | PERIOD (μm) | |
| COMPARATIVE EXAMPLE 1 | CsI+CuI(0.06wt%), TlI | | 0.1 | – | – | 100 |
| COMPARATIVE EXAMPLE 2 | CsI+CuI(0.5wt%), TlI | | 1 | – | – | 103 |
| EXAMPLE 1 | CsI+CuI (1wt%), TlI | CsI+CuI (0.3wt%), TlI | 25 | 0.2 | 0.4 | 126 |
| EXAMPLE 2 | CsI+CuI (0.7wt%), TlI | CsI, TlI | 5 | 0.35 | 0.4 | 107 |

SCINTILLATOR PLATE, METHOD FOR MANUFACTURING SCINTILLATOR PLATE, AND RADIATION DETECTION APPARATUS

BACKGROUND OF THE INVENTION

Field of the Invention

The present disclosure relates to a scintillator plate, a method for manufacturing a scintillator plate, and a radiation detection apparatus.

Description of the Related Art

Regarding a flat-panel detector (hereafter referred to as FPD) used for radiographic imaging in a medical field and the like, there is an indirect conversion FPD which converts radiation passed through an object to light by using a scintillator (radiation detection material) and detects the light emitted from the scintillator with a light-receiving element. In the scintillator to convert radiation to light, a columnar crystal group of an alkali metal halide such as cesium iodide is used to efficiently transfer the emitted light to a light-receiving element. In the columnar crystal group, gaps are formed between each of columnar crystals, and total reflection of the light is repeated in the crystal due to a difference in the refractive index between the crystal and the air so that the emitted light can be effectively guided to the light-receiving element.

Regarding the FPD in which such a columnar crystal group is used as a scintillator, when fusion of columnar crystals proceeds due to deliquescency intrinsic to just the alkali metal halide, the resolution of the scintillator deteriorates. Consequently, it is required to have gaps between columnar crystals by reducing the diameter of the columnar crystals.

Japanese Patent Laid-Open No. 2019-2801 discloses a technology to improve resolution of a scintillator by adding a specific element to the scintillator in which an acicular crystal of an alkali metal halide is used so as to control the diameter of the acicular crystal.

Regarding the technology disclosed in Japanese Patent Laid-Open No. 2019-2801, there is a disadvantage of deterioration in resolution of the scintillator due to an occurrence of light scattering between crystals since crystals formed in an initial stage of film formation are not sufficiently separated from each other.

SUMMARY OF THE INVENTION

The present disclosure was realized to address such a disadvantage and provides a technology useful to suppress light scattering between columnar crystals from occurring and to improve resolution of a scintillator.

The above-described disadvantage can be addressed by a scintillator plate in which a plurality of columnar crystals each containing a base material of a halogenated alkali metal compound and an activating agent are disposed on a substrate, the scintillator plate including a layer which is in contact with the substrate and in which a first phase composed of the halogenated alkali metal compound and a second phase composed of a material different from the base material and the activating agent are phase-separated and a layer composed of the plurality of columnar crystals in contact with the phase-separated layer.

Further features of the present disclosure will become apparent from the following description of exemplary embodiments with reference to the attached drawings.

BRIEF DESCRIPTION OF THE DRAWINGS

FIG. 8 is a diagram illustrating the forming condition, the shape, and the characteristics of a columnar crystal film according to the present disclosure.

DESCRIPTION OF THE EMBODIMENTS

The configuration and the manufacturing method of the scintillator plate and the radiation detection apparatus according to the present disclosure will be described below with reference to the attached drawings. In the following descriptions and drawings, a configuration common to a plurality of drawings is indicated by a common reference. Therefore, a common configuration is described mutually referring to a plurality of drawings, and explanations of a configuration indicated by a common reference are appropriately omitted. In the present disclosure, examples of the radiation include, in addition to α-rays, β-rays, γ-rays and the like which are beams made by particles (including photons) emitted due to radioactive decay, beams having the same level or more of energy such as X-rays, particle beams, and cosmic rays.

In the following description, as an example, the primary phase (base material) is set to be an alkali metal halide, in particular, cesium iodide (hereafter referred to as CsI), and the secondary phase is set to be an additive compound, in particular, copper (hereafter referred to as Cu) compound. An activating agent to apply a light-emitting function, for example, thallium (hereafter referred to as Tl), may be appropriately added to the scintillator.

Regarding the columnar crystal film, two regions below, that is, an initial layer and an upper layer, will be described separately. The initial layer denotes a region at an initial stage of film formation until the film thickness reaches several tens of micrometers, where the azimuth and the size of the columnar crystal and the film thickness are settled.

The upper layer denotes a region that is formed on the initial layer and that has a film thickness of several hundreds of micrometers. The base layer according to the present disclosure denotes a region that is formed at a very earlier stage of the film formation than the initial layer and that has unsettled azimuth and size of the columnar crystal.

Regarding the measure to examine phase separation of the base layer, element mapping evaluation can be performed on the basis of, for example, the energy dispersive X-ray spectroscopy (hereafter referred to as EDS).

Figure 1A:
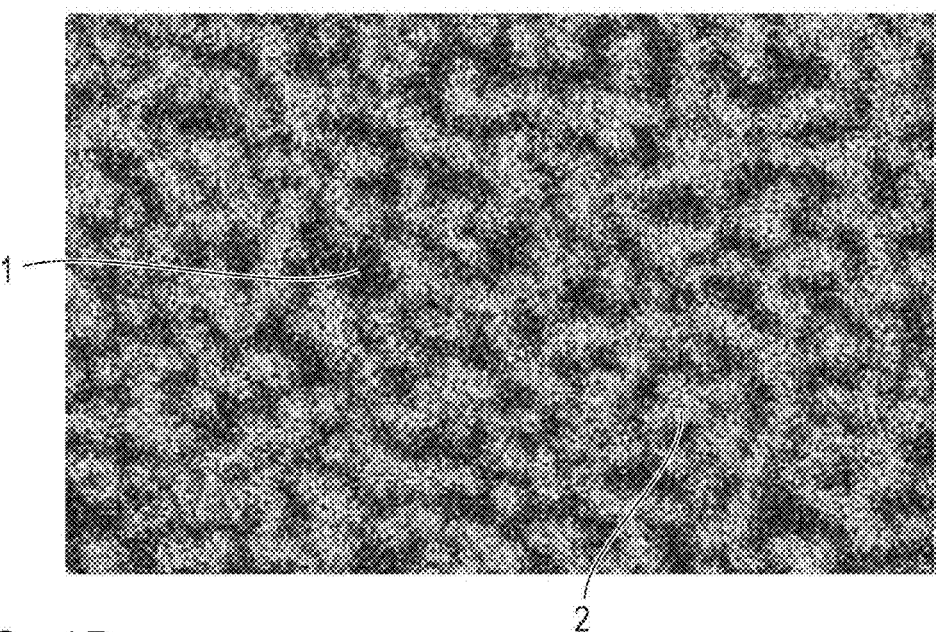
FIGS. 1A and 1B are element mapping images of a plane and a cross section, respectively, of an initial layer and a base layer according to the present disclosure.
Figure 1B:
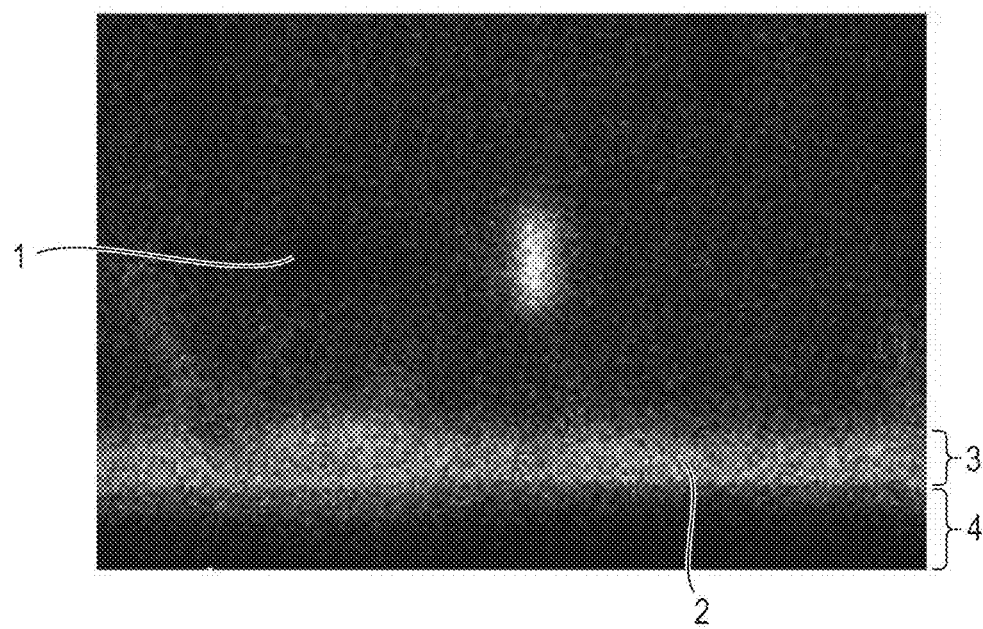

FIGS. 1A and 1B are element mapping images of a plane and a cross section of the initial layer and the base layer, respectively, according to the present disclosure. FIG. 1A is an image of element mapping evaluation with respect to a plane of the base layer according to the present disclosure on the basis of EDS. A black region indicates a primary phase 1 that is a first phase, and cesium (Cs) element is detected from the primary phase 1. A white region indicates a secondary phase 2 that is a second phase, and Cu element is detected from the secondary phase 2. As is clear from the above, in the structure, the primary phase 1 and the secondary phase 2 are intermingled while the primary phase 1 and the secondary phase 2 are phase-separated.

FIG. 1B is an image of element mapping evaluation with respect to a cross section of the initial layer and the base layer 3 on the basis of EDS. It is found that a layer containing the secondary phase 2 is formed since the secondary phase 2 is concentrated on the substrate 4. This layer is the base layer 3. Preferably, the thickness of the base layer 3 is small and is on the order of the crystal size of the CsI initial layer. For example, the thickness is desirably 2 µm or less and more preferably 1 µm or less.

Figure 2A:
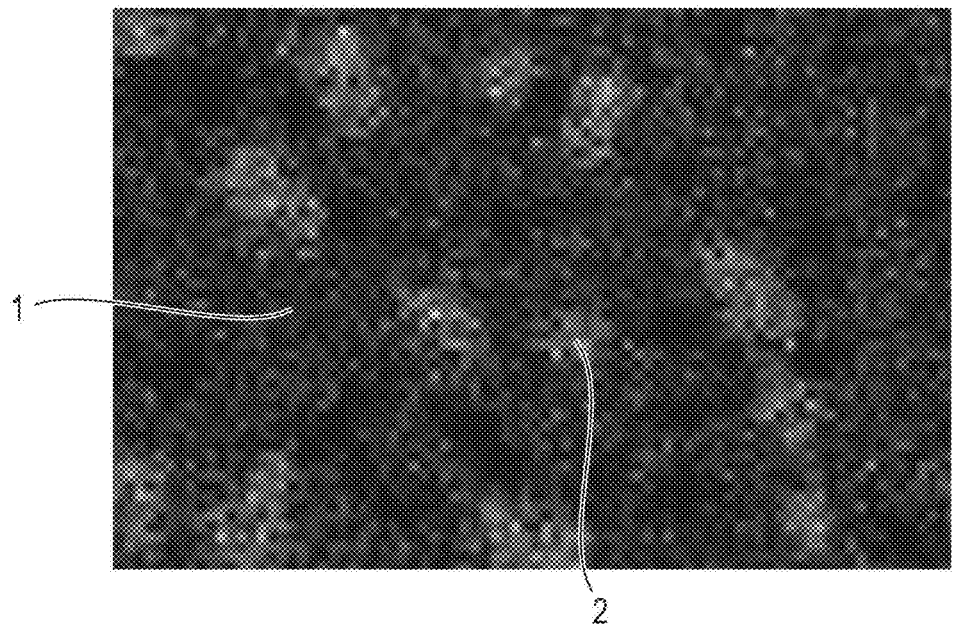
FIGS. 2A and 2B are element mapping images of a plane and a cross section, respectively, of an initial layer according to a comparative example.
Figure 2B:
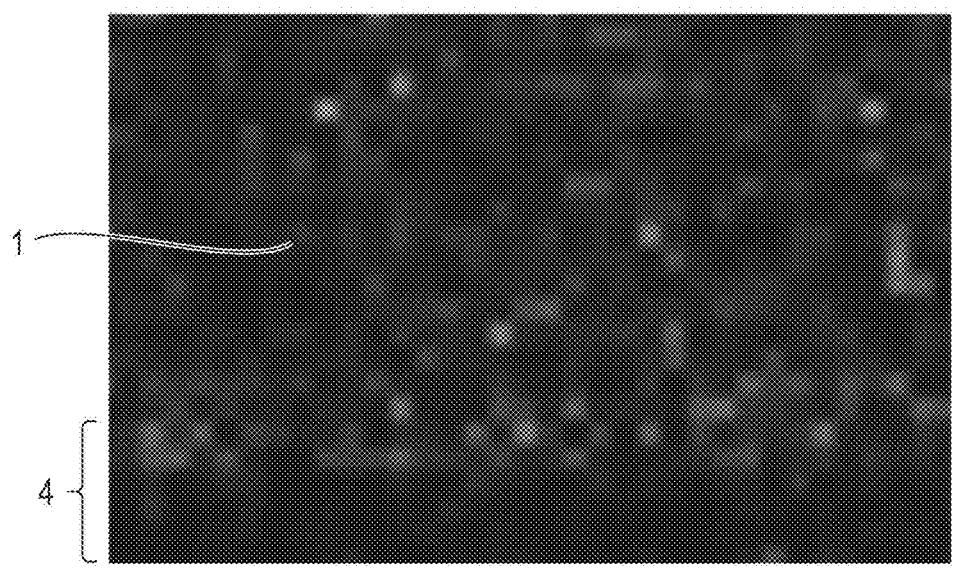

FIGS. 2A and 2B are element mapping images of a plane and a cross section, respectively, of an initial layer according to a comparative example.

FIG. 2A is an image of element mapping evaluation, on the basis of EDS, with respect to a plane of the initial layer according to the comparative example of the present disclosure in which the base layer 3 is not disposed. In FIG. 2A, a state in which the primary phase 1 is dotted with the secondary phase 2 is observed.

FIG. 2B is a sectional view illustrating element mapping evaluation, on the basis of EDS, with respect to an instance in which the base layer 3 is not disposed, that is, cross sections of the initial layer and the substrate 4. As is clear from FIG. 2B, the secondary phase 2 is not observed on the substrate 4, and, apparently, the base layer 3 is not present.

Figure 3A:
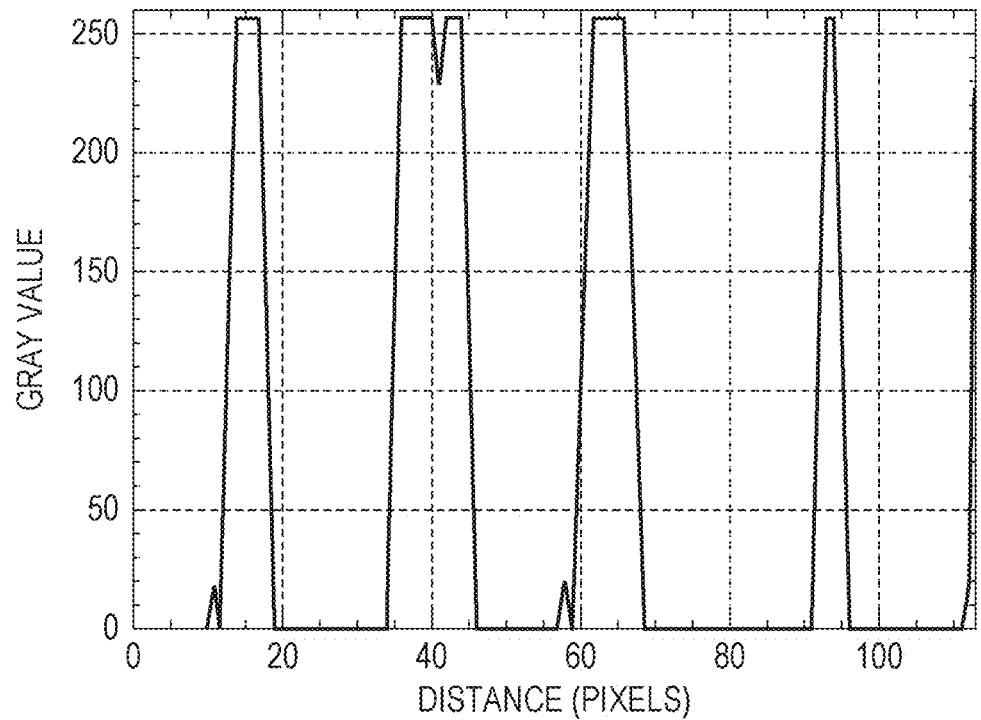
FIGS. 3A and 3B are line profiles corresponding to the element mapping images according to the present disclosure and the comparative example, respectively.
Figure 3B:
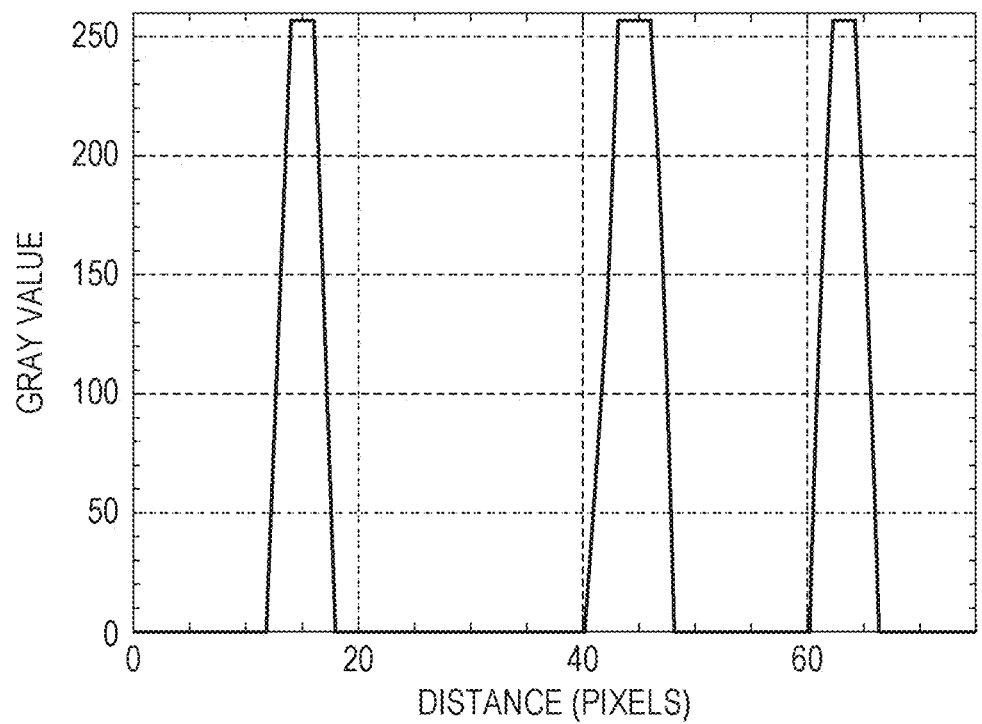

FIGS. 3A and 3B are line profiles corresponding to the element mapping images according to the present disclosure and the comparative example, respectively.

FIG. 3A is a line profile of the secondary phase 2 corresponding to the element mapping image according to the present disclosure illustrated in FIG. 1A. According to this, the period of distribution of the secondary phase 2 in the base layer 3 can be examined. For example, since the secondary phase 2 appears 5 times in the length of 2 µm in the line profile illustrated in FIG. 3A, it is found that the secondary phase 2 is distributed with a period of 0.4 µm.

FIG. 3B is a line profile of the secondary phase 2 corresponding to the element mapping image illustrated in FIG. 2A. According to this, the period of distribution of the secondary phase 2 in the initial layer can be examined. FIG. 3B is a line profile of the secondary phase 2 corresponding to the element mapping image according to the comparative example illustrated in FIG. 2A. Since the secondary phase 2 appears 3.5 times in the length of 7.3 µm in the line profile illustrated in FIG. 3B, it is found that the secondary phase 2 is distributed with a period of 2.1 µm.

Figure 5:
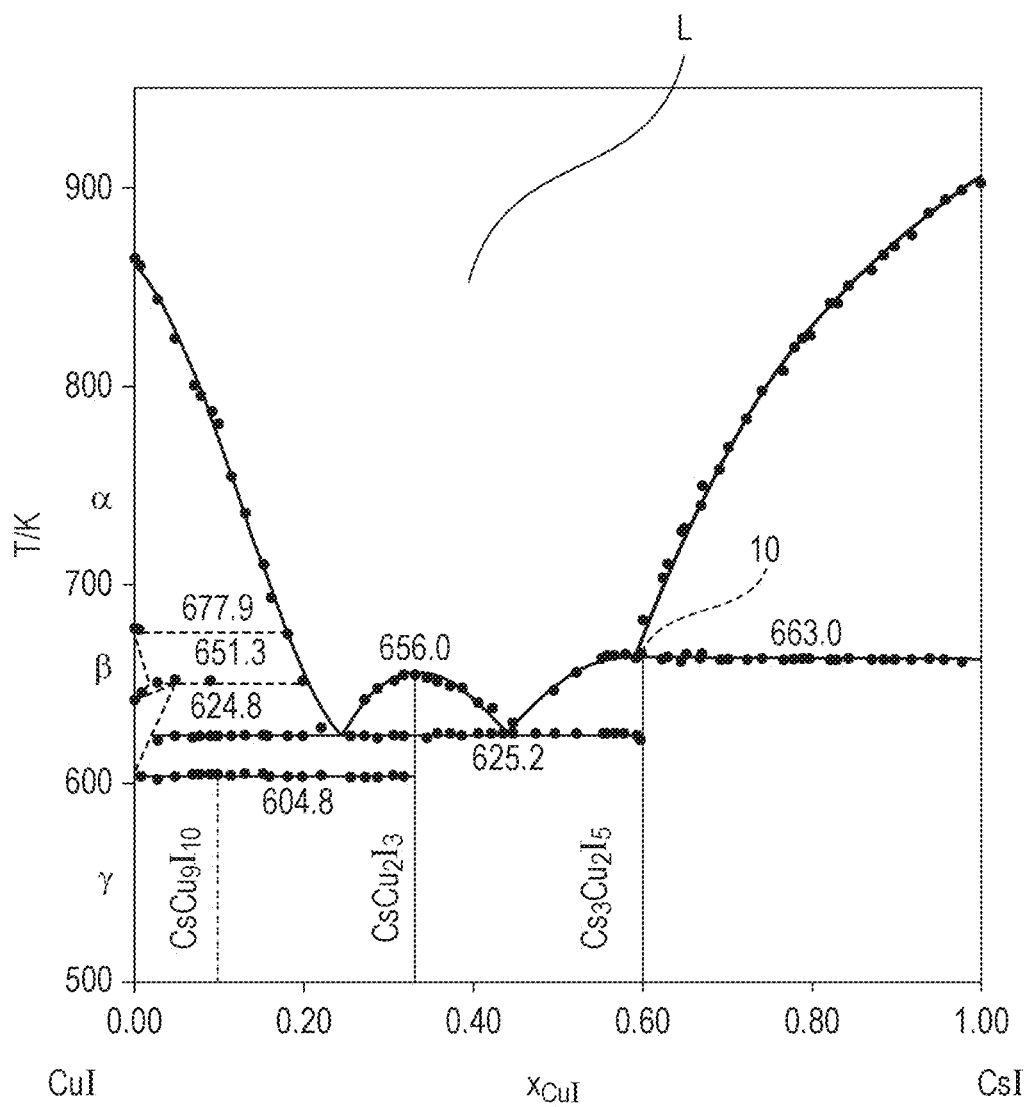
FIG. 5 is a phase diagram illustrating phase separation according to the present disclosure.

FIG. 5 is a phase diagram illustrating phase separation according to the present disclosure. In the present disclosure, the phase separation indicates a coexistence state of a plurality of compound phases in a solid phase state.

As is clear from FIG. 5, when a liquid phase (L) in which CsI in a proportion more than the ratio of CsI:CuI of 6:4 is mixed and melted is cooled, at least two phases, CsI and $Cs_3Cu_2I_5$, are coexistent at a eutectic point 10. When the base layer 3 is actually evaluated by X-ray diffraction, at least two phases, CsI and $Cs_3Cu_2I_5$, are observed. According to this, it is found that the primary phase 1 and the secondary phase 2 are composed of these two types of substances serving as main components.

The base material of a scintillator can be selected from halogenated alkali metal compounds capable of forming a columnar crystal group, for example, CsI and cesium bromide (CsBr). Regarding an activating agent, 0.2% by mole or more and 3.2% by mole or less of, for example, thallium iodide (TlI) or thallium bromide (TlBr) being contained relative to the base material enables a sufficient light-emitting function to be applied. The concentration of additive Cu element contained in the base layer 3 according to the present disclosure being set to be, for example, more than 1% by mole and more preferably 5% by mole or more relative to the Cs element serving as the base material enables the base layer 3 to obtain a structure in which the primary phase 1 and the secondary phase 2 are phase-separated.

According to the phase diagram illustrated in FIG. 5, the upper limit of the concentration of additive Cu element is less than 67% by mole and more preferably 25% by mole or less relative to the Cs element serving as the base material. Examples of usable additive material include compounds such as copper iodide (hereafter referred to as CuI) and copper bromide (CuBr).

Figure 6A:
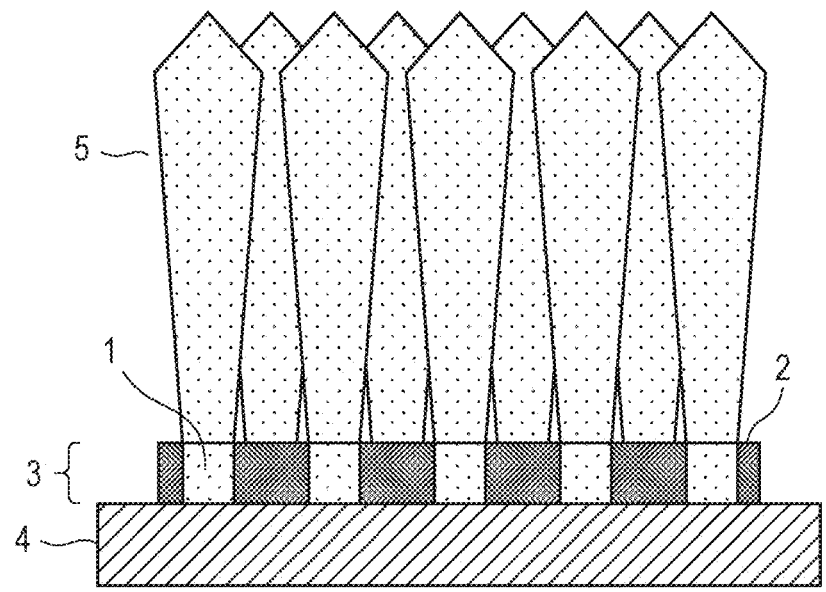
FIGS. 6A and 6B are schematic diagrams of columnar crystal groups according to the present disclosure and the comparative example, respectively.
Figure 6B:
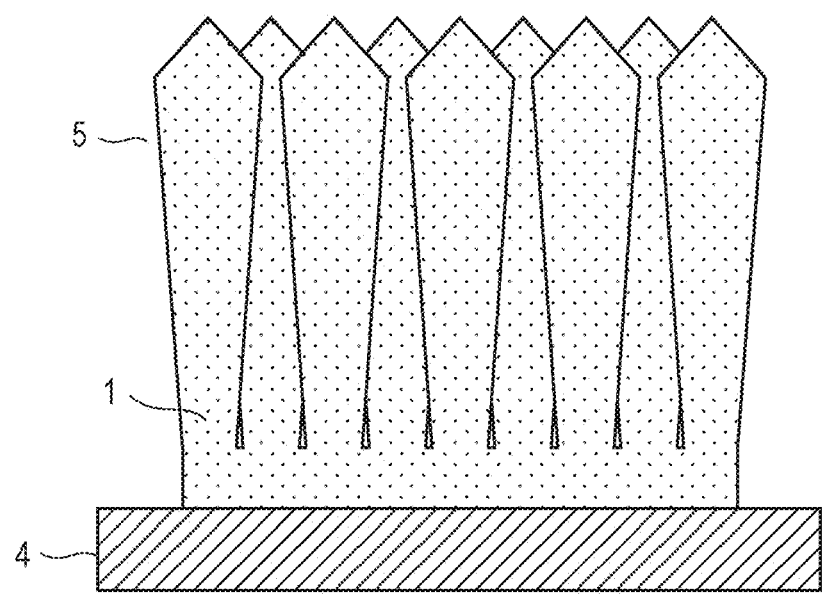

FIGS. 6A and 6B are schematic diagrams of columnar crystals 5 in the scintillator. FIG. 6A is a schematic diagram according to the present disclosure, and FIG. 6B is a schematic diagram according to the comparative example.

As illustrated in FIG. 6A, since columnar crystals 5 are formed contiguously from the primary phase 1 formed of the base material for the scintillator, each of the columnar crystals 5 is formed sufficiently separately from each other due to the structure in which the primary phase 1 and the secondary phase 2 are phase-separated. Therefore, light scattering between the columnar crystals 5 can be suppressed from occurring, and, as a result, the resolution of the scintillator can be improved.

On the other hand, as illustrated in FIG. 6B, when the base layer 3 is not disposed, just the primary phase 1 is formed on the substrate 4. In such an instance, since the distance between the columnar crystals 5 decreases compared with the present disclosure, light scattering readily occurs.

Figure 7:
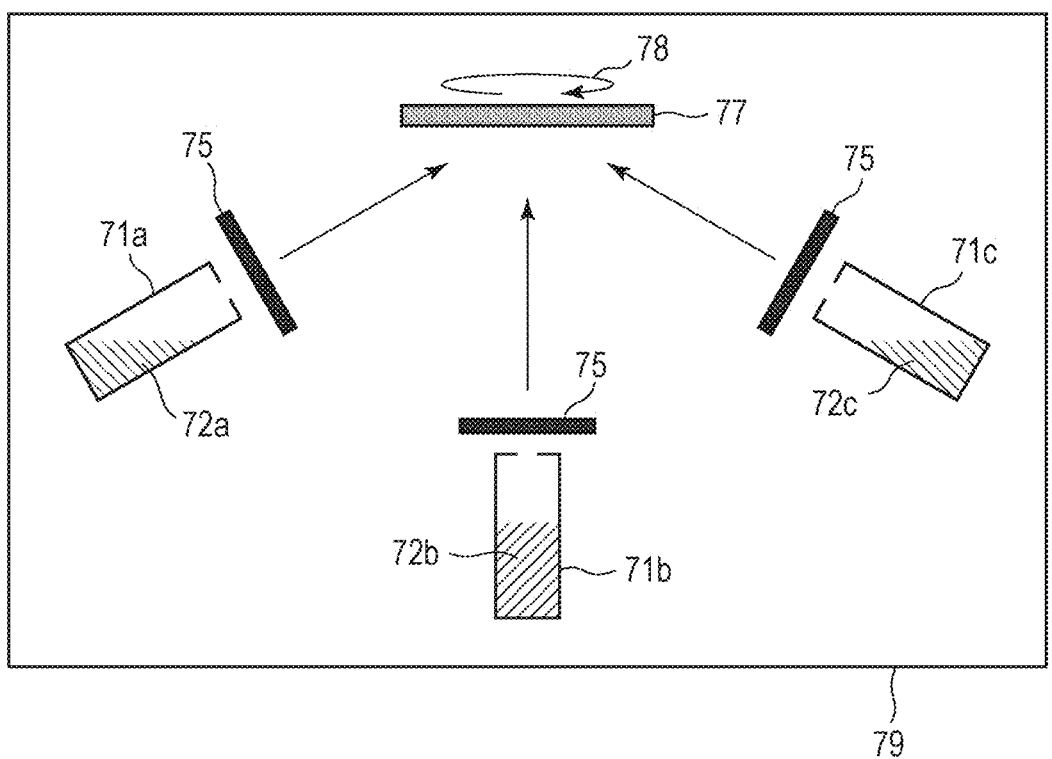
FIG. 7 is a schematic diagram of a vacuum vapor deposition apparatus to form a columnar crystal group according to the present disclosure.

FIG. 7 is a schematic diagram of a vacuum vapor deposition apparatus to form the scintillator according to the present disclosure. For example, as illustrated in FIG. 7, a material supply source 71 and a deposition surface 77 provided with a rotation portion 78 are disposed in a chamber 79 capable of being evacuated, and the substrate 4 to undergo vapor deposition is set on the deposition surface 77.

In the comparative example and the example described later, a tantalum cylinder is used as a material supply source 71a and a material supply source 71c, and boron nitride crucible is used as a material supply source 71b. A plurality of material supply sources 71 may be disposed on a material basis, or a mixed materials may be placed in the material supply source 71.

A shutter 75 of the material supply source 71 may be appropriately disposed. The material supply source 71 being provided with the shutter 75 and the degree of opening being controlled enable an appropriate amount of additive material to be added to any film thickness region.

Regarding a protective film to protect the deposited film from moisture, a parylene film, a fluororesin film, a tetraethyl orthosilicate (TEOS) film or the like may be formed by various coating methods such as spraying, coating, and chemical vapor deposition (CVD).

The column shape of the columnar crystals 5 in the resulting scintillator can be observed by using a scanning electron microscope or the like. In addition, the composition and the element distribution state can be evaluated by element mapping on the basis of EDS.

Regarding evaluation of the resolution characteristics, quantitative comparison can be performed by measuring the modulation transfer function (hereafter referred to as MTF). The detection quantum efficiency (DQE) can be evaluated by using various light-receiving elements such as CCD and CMOS and photo detectors such as cameras. In addition, the chemical composition of the deposited film can be evaluated by, for example, X-ray fluorescence analysis or inductively coupled plasma spectroscopy, and the crystallinity can be evaluated by, for example, X-ray diffraction analysis.

The substrate temperature and the each vapor source temperature can be appropriately adjusted in accordance with the vapor deposition condition. For example, a necessary addition concentration can be realized by adjusting the temperature to be between 670° C. to 700° C. for CsI and to be between 340° C. to 410° C. for TlI. In the present disclosure, to form the base layer 3 having a structure in which the primary phase 1 and the secondary phase 2 are phase-separated, the substrate temperature at the initial stage of film formation is set to be, for example, between 20° C. to less than 200° C., and the vapor source temperature of CuI is set to be, for example, 520° C. or higher.

When activation of the activating agent responsible for a light emission function is insufficient and predetermined light emission luminance is not obtained, the light emission luminance can be improved by increasing the substrate temperature to a level at which the structure of the columnar crystals 5 is not distorted at the latter stage of film formation so as to activate the activating agent responsible for a light emission function. Alternatively, a predetermined luminance can be obtained while the structure of the columnar crystals 5 is maintained by performing heat treatment with a vapor deposition apparatus or the like after film formation.

FIG. 8 illustrates the forming condition, the shape, and the characteristics of a radiation detection apparatus according to the present disclosure. When MTF, that is an index of the resolution of the scintillator, at a spatial frequency of 2 Lp/mm (hereafter referred to as MTF(2)) is compared with that in the comparative example according to the related art, it is found that the resolution of each of example 1 and example 2 is improved.

Figure 9A:
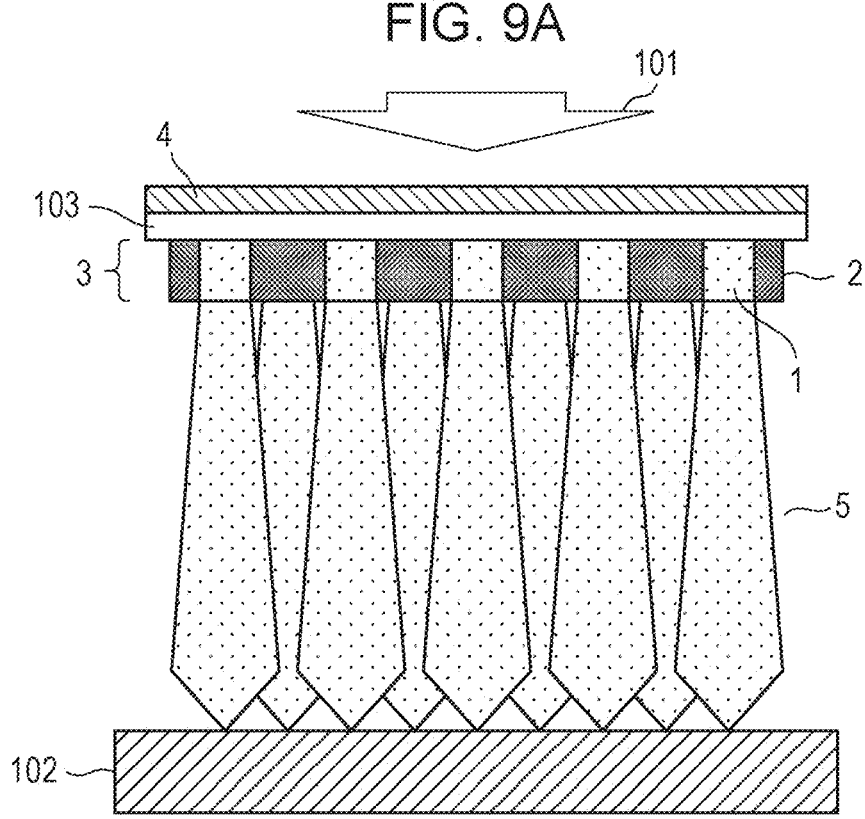
FIGS. 9A and 9B are schematic diagrams of scintillator plates including a columnar crystal group according to the present disclosure.
Figure 9B:
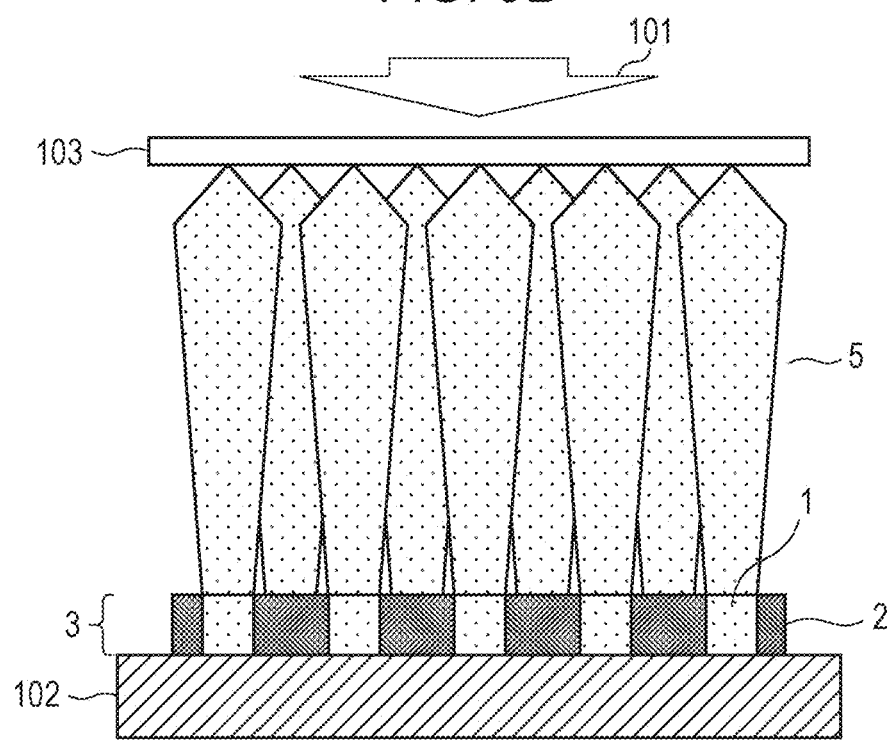

FIGS. 9A and 9B are configuration diagrams of scintillator plates including a scintillator according to the present disclosure. In an example of the configuration illustrated in FIG. 9A, a reflection layer 103, a base layer 3, and columnar crystals 5 are disposed on back surface of the surface of the substrate 4 on which an X-ray 101 is incident when the scintillator plate is applied to the radiation detection apparatus (described later) and a photo detector 102 is further combined. The reflection layer 103 plays a role of returning the light that is emitted from the scintillator and that is not incident on the photo detector to the photo detector. Alternatively, as illustrated in FIG. 9B, a configuration in which the base layer 3 and the columnar crystals 5 are disposed directly on the photo detector 102 may be adopted.

The scintillator plate having the above-described configuration may be applied to a radiation detection apparatus (radiation imaging apparatus).

Figure 10:
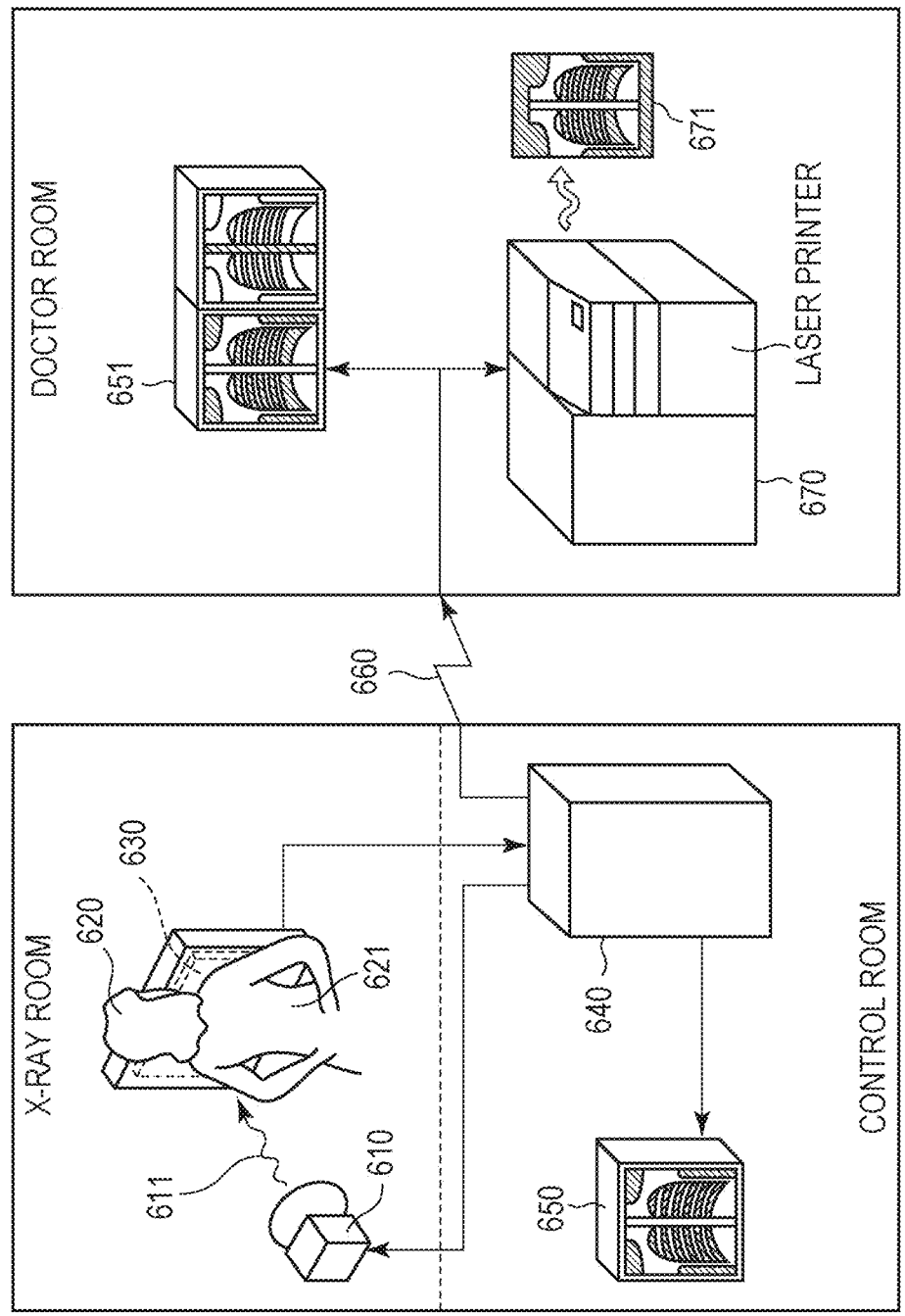
FIG. 10 is a schematic diagram illustrating an example of the application form of a radiation detection apparatus according to the present disclosure.

FIG. 10 illustrates an example of the application form of a radiation detection apparatus 630. The radiation 611 emitted from a radiation source 610 passes through the chest 621 of a subject 620 such as a patient and is incident on the radiation detection apparatus 630. The radiation 611 incident on the radiation detection apparatus 630 includes the information in the body of the subject 620, and the radiation detection apparatus 630 acquires electrical information in accordance with the radiation 611. The electrical information is converted to digital signals and, thereafter, is subjected to predetermined signal processing by, for example, an image processor 640.

A user such as a doctor can observe the radiation image in accordance with the electric information by, for example, a first display 650 in a control room. The user can transfer the radiation image or the data thereof to a remote location by a predetermined communication unit 660, and the radiation image can also be observed by a second display 651 in a doctor room at another place. The user can also record the radiation image or the data thereof on a predetermined recording medium, for example, can also record on a film 671 by a film processor 670.

The comparative examples and the examples according to the present disclosure will be described below.

Comparative Example 1

In the present comparative example, the vacuum vapor deposition apparatus illustrated in FIG. 7 was used, and a deposited film having a columnar crystal structure in which the base material was CsI, the additive material was CuI, and the activating agent was TlI was formed.

The material supply source 71a was filled with a vapor deposition raw material 72a in which 0.06% by weight of CuI was mixed into CsI. In addition, the material supply source 71c was filled with TlI serving as a vapor deposition raw material 72c. The substrate 4 was set on the deposition surface 77. A silicon substrate on which an aluminum reflection layer having a thickness of 100 nm and silicon dioxide having a thickness of 50 nm were stacked was used as the substrate 4.

The interior of the vapor deposition apparatus was evacuated to 0.01 Pa or less. Thereafter, each material supply source 71 was heated by gradually passing a current. When a predetermined temperature was reached, film formation was started by opening the shutter 75 disposed between the substrate 4 and the material supply source 71 while the substrate 4 was rotated by the rotation portion 78. In this regard, the substrate temperature was gradually increased from 60° C. to 130° C. The state of film formation was checked, and when a predetermined thickness was formed, the shutter 75 was closed so as to complete film formation. Subsequently, the temperature of the substrate 4 was further increased to 160° C.

Figure 4A:
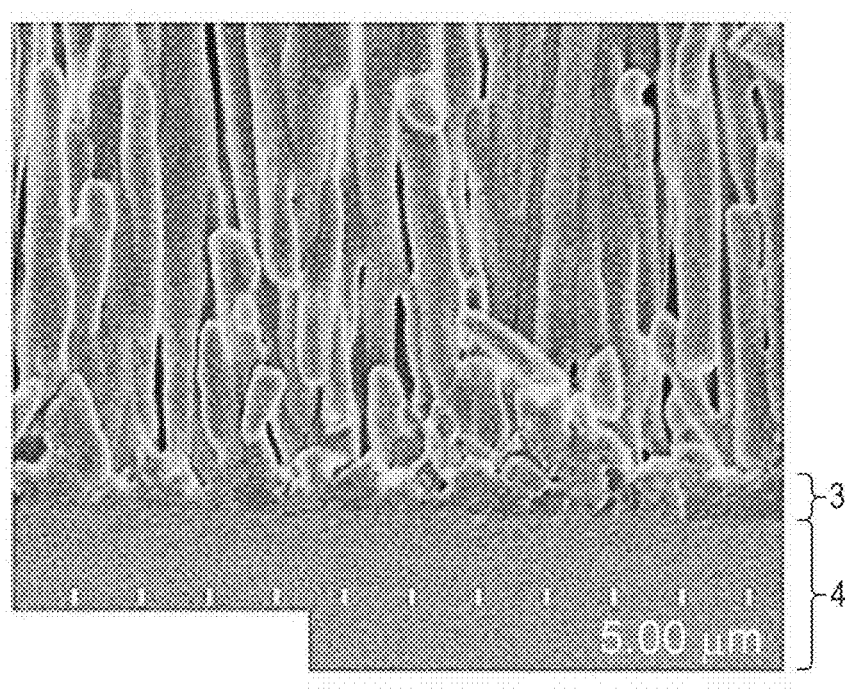
FIGS. 4A and 4B are images of columnar crystal groups according to the present disclosure and the comparative example, respectively, observed from a film side surface.
Figure 4B:
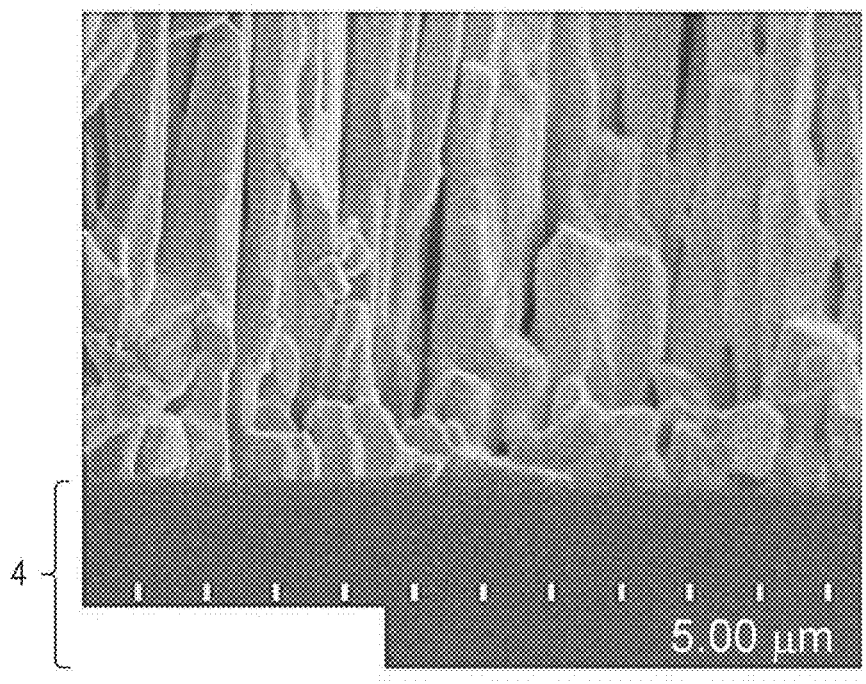

The substrate 4 after film formation was cooled to room temperature and removed from the vapor deposition apparatus. According to observation of a cross section of the deposited film by a scanning electron microscope, as illustrated in FIG. 4B, it was observed that the base layer 3 was not formed on the substrate 4 and that just columnar crystals 5 were formed. Further, the deposited film was peeled off the substrate 4, and a contact surface of the substrate 4 and the deposited film and a film cross section of the deposited film were subjected to element mapping evaluation on the basis of EDS. As a result, formation of the base layer 3 according to the present disclosure was not observed.

According to the measurement of the chemical composition by an X-ray fluorescence analyzer, 0.65% by mole of Tl and 0.1% by mole of copper relative to the base material were detected.

The film formation surface of the deposited film was made to closely adhere to a CMOS photo detector with a fiber optical plate (FOP) interposed therebetween, and X-rays in conformity with the international standard radiation quality of RQA5 was applied from the substrate 4 side so as to acquire an image. In addition, MTF(2), that is an index of the resolution of the scintillator, was determined on the basis of an edge method by using a tungsten knife edge, the result was assumed to be 100, and was relatively compared with the other comparative example and the examples.

Comparative Example 2

In the present comparative example, the vacuum vapor deposition apparatus illustrated in FIG. 7 was used, and a deposited film having a columnar crystal structure in which the base material was CsI, the additive material was CuI, and the activating agent was TlI was formed.

The material supply source 71a was filled with a vapor deposition raw material 72a in which 0.5% by weight of CuI was mixed into CsI. In addition, the material supply source 71c was filled with TlI serving as a vapor deposition raw material 72c. The substrate 4 was set on the deposition surface 77. A silicon substrate on which an aluminum reflection layer having a thickness of 100 nm and silicon dioxide having a thickness of 50 nm were stacked was used as the substrate 4 in the same manner as in comparative example 1.

The interior of the vapor deposition apparatus was evacuated to 0.01 Pa or less. Thereafter, each material supply source 71 was heated by gradually passing a current. When a predetermined temperature was reached, film formation was started by opening the shutter 75 disposed between the substrate 4 and the material supply source 71 while the substrate 4 was rotated by the rotation portion 78. In this regard, the substrate temperature was gradually increased from 60° C. to 130° C. The state of film formation was checked, and when a predetermined thickness was formed, all the shutters 75 were closed so as to complete film formation. Subsequently, the temperature of the substrate 4 was further increased to 160° C.

The substrate 4 after film formation was cooled to room temperature and removed from the vapor deposition apparatus. According to observation of a cross section of the deposited film by a scanning electron microscope, as illustrated in FIG. 4B, it was observed that the base layer 3 was not formed on the substrate 4 and that just columnar crystals 5 were formed. Further, the deposited film was peeled off the substrate 4, and a contact surface of the substrate 4 and the deposited film and a film cross section of the deposited film were subjected to element mapping evaluation on the basis of EDS. As a result, formation of the base layer 3 according to the present disclosure was not observed.

According to the measurement of the chemical composition by an X-ray fluorescence analyzer, 0.69% by mole of Tl and 1.0% by mole of copper relative to the base material were detected. The MTF(2) was determined in the same manner as in comparative example 1. The resulting MTF(2) was relatively evaluated where MTF(2) of the comparative example 1 was assumed to be 100. As a result, the value was 103.

Example 1

In the present example, the vacuum vapor deposition apparatus illustrated in FIG. 7 was used, and a deposited film having a columnar crystal structure in which the base material was CsI, the additive material was CuI, and the activating agent was TlI was formed.

The material supply source 71a was filled with a vapor deposition raw material 72a in which 0.3% by weight of CuI was mixed into CsI. In addition, the material supply source 71b was filled with CuI serving as a vapor deposition raw material 72b.

Further, the material supply source 71c was filled with TlI serving as a vapor deposition raw material 72c. The substrate 4 was set on the deposition surface 77. A silicon substrate on which an aluminum reflection layer having a thickness of 100 nm and silicon dioxide having a thickness of 50 nm were stacked was used as the substrate 4 in the same manner as in the comparative example.

The interior of the vapor deposition apparatus was evacuated to 0.01 Pa or less. Thereafter, the temperature of the substrate 4 was maintained at 60° C. Each material supply source 71 was heated by gradually passing a current. When a predetermined temperature was reached, film formation of the base layer 3 was started by opening the shutter 75 disposed between the substrate 4 and the material supply source 71 while the substrate 4 was rotated by the rotation portion 78. Subsequently, the shutter 75 was closed, and film formation of an upper layer was performed while the temperature of the substrate 4 was gradually increased from 60° C. to 130° C. When a predetermined thickness was formed, all the shutters were closed so as to complete film formation.

The substrate 4 after film formation was cooled to room temperature and removed. According to observation of a cross section of the deposited film by a scanning electron microscope, as illustrated in FIG. 4A, the base layer 3 was clearly observed on the substrate 4, and the state in which columnar crystals 5 were formed thereon sufficiently separately from each other was observed. Further, the deposited film was peeled off the substrate 4, and a contact surface of the substrate 4 and the deposited film and a film cross section of the deposited film were subjected to element mapping evaluation on the basis of EDS. As a result, formation of the base layer 3 according to the present disclosure and the state in which the primary phase 1 and the secondary phase 2 were phase-separated in the base layer 3 was observed as illustrated in FIG. 1A and FIG. 1B.

According to the measurement of the chemical composition by an X-ray fluorescence analyzer, 0.83% by mole of Tl and 25.0% by mole of copper relative to the base material were detected. The MTF(2) was determined in the same manner as in the comparative example and was relatively evaluated where the MTF(2) of the comparative example 1 was assumed to be 100. As a result, the value was 126.

According to the above, it was found that the scintillator including the columnar crystals 5 formed on the base layer 3 having a structure in which the primary phase 1 and the secondary phase 2 are phase-separated can suppress light scattering between the columnar crystals 5 from occurring so as to improve resolution.

Example 2

In the present example, the vacuum vapor deposition apparatus illustrated in FIG. 7 was used, and a deposited film having a columnar crystal structure in which the base material was CsI, the additive material was CuI, and the activating agent was TlI was formed.

The material supply source 71a was filled with CsI serving as a vapor deposition raw material 72a. In addition, the material supply source 71b was filled with CuI serving as a vapor deposition raw material 72b. Further, the material supply source 71c was filled with TlI serving as a vapor deposition raw material 72c. The substrate 4 was set on the deposition surface 77. The incident angle of the vapor particles from the material supply source 71a of CsI on the deposition surface 77 was set to be 60 degrees. A silicon substrate on which an aluminum reflection layer having a thickness of 100 nm and silicon dioxide having a thickness of 50 nm were stacked was used as the substrate 4 in the same manner as in the comparative example.

The interior of the vapor deposition apparatus was evacuated to 0.01 Pa or less. Thereafter, the temperature of the substrate 4 was maintained at 40° C. Each material supply source 71 was heated by gradually passing a current. When a predetermined temperature was reached, film formation of the base layer 3 was started by opening the shutter 75 disposed between the substrate 4 and the material supply source 71 while the substrate 4 was rotated by the rotation portion 78. Subsequently, the shutter 75 was closed, and film formation of an upper layer was performed while the temperature of the substrate 4 was gradually increased from 40° C. to 140° C. When a predetermined thickness was formed, all the shutters were closed so as to complete film formation.

The substrate 4 after film formation was cooled to room temperature and removed. According to observation of a cross section of the deposited film by a scanning electron microscope, as illustrated in FIG. 4A, the base layer 3 was clearly observed on the substrate 4, and the state in which columnar crystals 5 were formed thereon sufficiently separately from each other was observed in the same manner as in example 1.

According to the measurement of the chemical composition by an X-ray fluorescence analyzer, 0.76% by mole of Tl and 5.0% by mole of copper relative to the base material were detected. The MTF(2) was determined in the same manner as in the comparative example and was relatively evaluated where the MTF(2) of the comparative example 1 was assumed to be 100. As a result, the value was 107.

According to the above, it was found that the scintillator including the columnar crystals 5 formed on the base layer 3 having a structure in which the primary phase 1 and the secondary phase 2 are phase-separated can suppress light scattering between the columnar crystals 5 from occurring so as to improve resolution.

While the examples according to the present disclosure have been described above, the disclosure is not limited to the disclosed examples, and partial modification may be performed within the bound of not departing from the scope of the disclosure. It is needless to say that each term described in the present specification is used to just explain the present disclosure and that the present disclosure is not limited to the strict sense of the term and may include the equivalents thereof.

According to the present disclosure, light scattering between columnar crystals can be suppressed from occurring and high resolution can be realized.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-192214, filed Nov. 19, 2020, which is hereby incorporated by reference herein in its entirety.

What is claimed is:

1. A scintillator plate in which a plurality of columnar crystals each containing a base material of a halogenated alkali metal compound and an activating agent are disposed on a substrate, the scintillator plate comprising:
   a layer which is in contact with the substrate and in which a first phase composed of the halogenated alkali metal compound and a second phase composed of a material different from the base material and the activating agent are phase-separated; and
   a layer composed of the plurality of columnar crystals in contact with the phase-separated layer.

2. The scintillator plate according to claim 1, wherein the first phase contains CsI as a main component.

3. The scintillator plate according to claim 1, wherein the second phase contains $Cs_3Cu_2I_5$ as a main component.

4. The scintillator plate according to claim 1, wherein a concentration of a Cu element in the phase-separated layer is within the range of more than 1% by mole and less than 67% by mole relative to a Cs element.

5. The scintillator plate according to claim 1, wherein a concentration of a Cu element in the phase-separated layer is within the range of 5% by mole or more and 25% by mole or less relative to a Cs element.

6. The scintillator plate according to claim 1, wherein a thickness of the phase-separated layer is 2 μm or less.

7. The scintillator plate according to claim 1, wherein in the phase-separated layer, the second phase is disposed with a period of 2 μm or less.

8. The scintillator plate according to claim 1, wherein the substrate is a photo detector to detect light converted from incident radiation by the columnar crystals.

9. A radiation detection apparatus comprising:
   the scintillator plate according to claim 1; and
   a photo detector to detect light converted from incident radiation by the columnar crystals.

10. A method for manufacturing a scintillator plate in which a scintillator including a plurality of columnar crystals each containing a base material of a halogenated alkali metal compound and an activating agent is disposed on a substrate, the method comprising:
    forming a layer in which a first phase composed of the halogenated alkali metal compound is phase-separated by a second phase composed of a material different from the base material and the activating agent; and
    forming a layer composed of the plurality of columnar crystals in contact with the phase-separated layer.

* * * * *